March 9, 1926.  
E. G. KIMMICH  
FLEXIBLE COUPLING  
Original Filed Sept. 5, 1922

1,575,921

INVENTOR  
Elmer G. Kimmich,  
BY  
ATTORNEY

Patented Mar. 9, 1926.

1,575,921

UNITED STATES PATENT OFFICE.

ELMER G. KIMMICH, OF AKRON, OHIO, ASSIGNOR TO THE GOODYEAR TIRE & RUBBER COMPANY, OF AKRON, OHIO, A CORPORATION OF OHIO.

FLEXIBLE COUPLING.

Original application filed September 5, 1922, Serial No. 586,280. Divided and this application filed September 27, 1924. Serial No. 740,267.

*To all whom it may concern:*

Be it known that I, ELMER G. KIMMICH, a citizen of the United States, and resident of Akron, Ohio, have invented new and useful Improvements in Flexible Couplings, of which the following is a specification.

My invention relates to discs for use in flexible couplings and it is particularly directed to an improved form of disc that is adapted to be interposed between the driving and the driven members of a flexible coupling.

The present application is a division of my co-pending application Serial No. 586,280, filed September 5, 1922, for flexible couplings.

The general nature of the invention, of which the present is a division, is fully set forth in the above specified prior application, and therefore the present application will be specifically directed to a particular form of the disc shown in the prior application.

Figure 1:
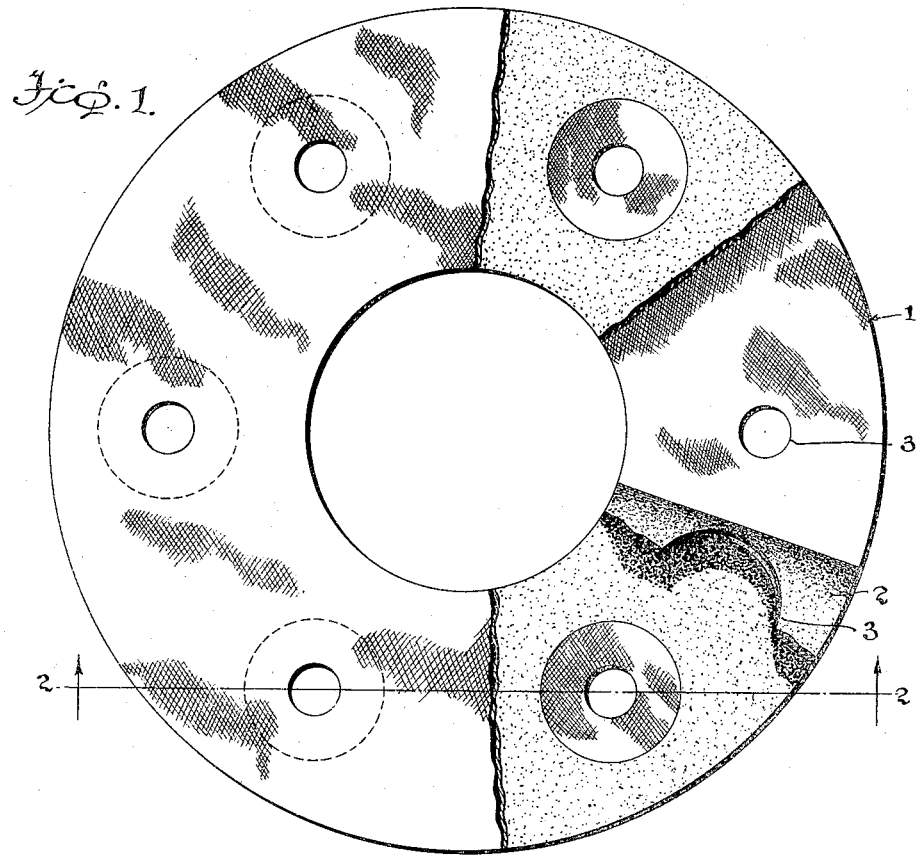
Figure 2:

Fig. 1 of the accompanying drawing is a view shown partially in section and partially in plan, parts being broken away, of a disc constructed in accordance with my invention; and Fig. 2 is a sectional edge view of the disc taken substantially on the line II—II of Fig. 1.

The various layers of material entering into the disc assembly shown in Fig. 1 are successively broken away and folded back to show the disc construction. The disc herein illustrated comprises a plurality of complete fabric discs 1 that are alternated with layers 2 of rubber composition. The rubber composition of the discs 2 is cut away at each of the driving holes 3 that are formed in the disc and the rubber composition at each of such points is replaced by a washer 4, preferably of fabric, that is materially less compressible than the rubber composition of the disc.

The disc, assembled as described, is vulcanized under heat and pressure in accordance with customary practice.

This particular assembly of fabric and rubber produces a driving disc in which the zone of the disc in the immediate vicinity of the driving holes is relatively incompressible. This provides an especially serviceable material at the point where the disc is adapted to be clamped between driving members of universal couplings, not shown, with which it is adapted to be used in the ordinary manner. The portion of the disc intermediate the driving holes is rendered very flexible by reason of the thickness of rubber between adjacent fabric plies. This interposed rubber cushion body of the disc prevents separation of the plies in service and also increases the life of the discs by reducing the flexing strains on the fabric.

Facing sheets of fabric, or other wear-resisting material, are applied to each face of the disc in order to improve its appearance and to prevent deterioration of the disc from outside elements.

The advantages to be gained by adopting the construction herein set forth are treated, at length, in my aforementioned prior application as inherent in the general structure therein shown.

Although a single embodiment of my invention has been shown and specifically described, it will be obvious to those skilled in the art that various minor modifications and changes may be made within the spirit and scope of the invention and I desire, therefore, that only such limitations shall be imposed as are indicated by the appended claims.

What I claim is:

1. A composite disc for flexible couplings comprising a plurality of superposed alternated layers of rubber and fabric in a flexing zone of the disc and fabric washers interposed between adjacent layers of fabric in the zone of the driving holes of the disc.

2. A composite disc for driving couplings comprising superposed layers of rubber and fibrous material in the flexing zones of the disc and superposed layers of closely assembled fabric in each zone of the disc intermediate the flexing zones, the alternate layers of the disc comprising a unitary fabric sheet of substantially the full size of the disc.

3. A composite disk for flexible couplings having flexing zones and driving zones, comprising a plurality of alternately disposed layers of fabric and rubber in the flexing zones and fabric spacer washers interposed between the layers of fabric in the driving zones.

4. A unitary disc for flexible couplings comprising a plurality of layers of integral fibrous material, of substantially the same size as the disc, and lying in the plane thereof, a plurality of layers of rubber composition interposed between the layers of fibrous material, and a plurality of spacer members of fibrous material interposed between adjacent layers of fabric in the zone of connection of the disc, each of said spacer members being positioned in the plane of one of said layers of rubber composition.

In witness whereof, I have hereunto signed my name.

ELMER G. KIMMICH.